United States Patent

[11] 3,628,831

| | | |
|---|---|---|
| [72] | Inventor | Albert R. Close<br>Detroit, Mich. |
| [21] | Appl. No. | 43,889 |
| [22] | Filed | June 5, 1970 |
| [45] | Patented | Dec. 21, 1971 |
| [73] | Assignee | Ford Motor Company<br>Dearborn, Mich. |

[54] SEAT BACK POSITION CONTROL MECHANISM
15 Claims, 4 Drawing Figs.

[52] U.S. Cl. .................................................... 297/379
[51] Int. Cl. ...................................................... A47c 3/00,
B60n 1/02
[50] Field of Search ........................................... 297/379

[56] References Cited
UNITED STATES PATENTS

| | | | |
|---|---|---|---|
| 2,737,229 | 3/1956 | Semar ......................... | 297/379 |
| 2,873,794 | 2/1959 | Leslie et al. .................. | 297/379 |
| 3,549,202 | 12/1970 | Boschen et al. ............... | 297/379 |

*Primary Examiner*—James C. Mitchell
*Attorneys*—John R. Faulkner and Roger E. Erickson ABSTRACT: A seat back position control mechanism for a vehicle seat assembly that has a generally horizontal seat structure and an upstanding backrest structure pivotally supported on support arms for tiltable movement forwardly over the seat structure. A latch pawl normally is maintained in latching attitude and its inertia is a factor in preventing backrest movement upon the occurrence of a predetermined maximum vehicle deceleration. Following such a deceleration, a secondary inertia means in the form of free-swinging pendulum means maintains the latch pawl in latching attitude and acts as a time delay release. Manual activation means are also provided to permit movement of the latch pawl from its latching attitude. Further, a shiftable pivot means cooperates with the pendulum means to prevent undesired forward tilting movement of the backrest and an attached occupied child seat upon normal braking of the vehicle.

PATENTED DEC 21 1971 3,628,831

INVENTOR.
Albert R. Close
BY John R. Faulkner
Roger E. Erickson
ATTORNEYS.

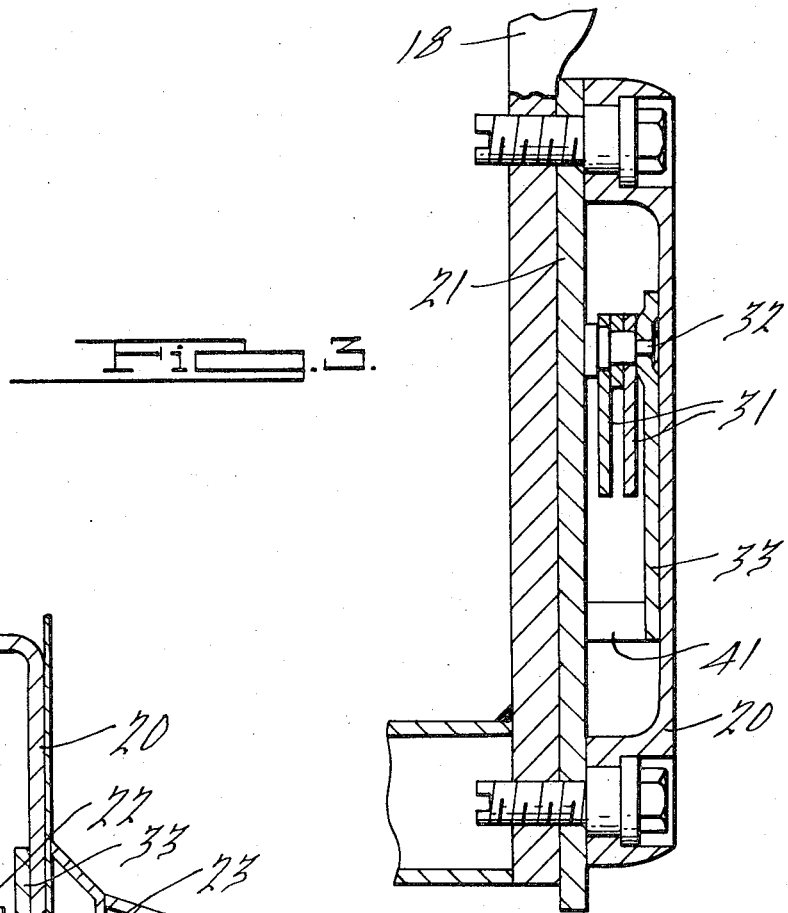
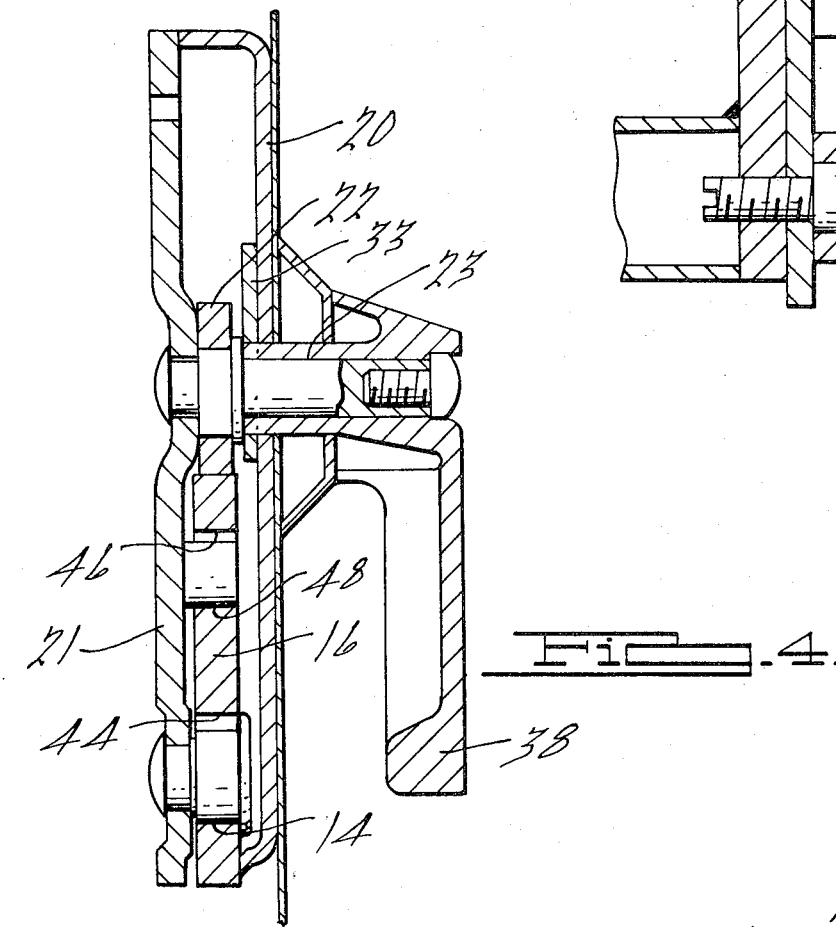

SEAT BACK POSITION CONTROL MECHANISM

BACKGROUND OF THE INVENTION

The prior art, as exemplified by U.S. Pat. No. 2,873,794 discloses the use of an inertia latch mechanism for holding pivotal or folding seat backrests of certain motor vehicle seat assemblies, such as those utilized in two-door models, against tiltable movement relative to the horizontal seat cushion. In such an inertia latch mechanism, a latching pawl or the like normally is in a latching attitude. The inertia of the latching pawl resists movement from this attitude and is utilized to prevent forward tilting movement of the backrest when the deceleration rate of the vehicle is above the predetermined maximum such as occurs in a vehicle under extreme deceleration conditions. The latching of the backrest under such conditions contributes to the stability of the seat occupant and also enables the backrest to function as a protective barrier for a rear seat occupant.

If the rate at which force is applied to the backrest to tilt forwardly is moderate, the latch pawl is movable either by gravity or by a spring bias to a nonlatching attitude. The backrest thus may be tilted forwardly by the application of moderate manual pressure at a low rate such as is desirable to permit ingress or egress to or from the rear seat area of the passenger compartment.

It is the object of the invention to provide a further, secondary inertial responsive means to provide a time delay means which maintains the latch pawl in a latching condition for period of time following a deceleration in excess of a predetermined magnitude. The invention also provides a latch construction which assures proper response of the secondary inertial responsive means under nearly all foreseeable, normal and abnormal vehicle operating conditions.

It is an additional object of the invention to provide means to prevent during normal braking of the vehicle forwardly tilting movement of the backrest having attached to it an overhanging weight such as an occupied child seat.

It is an additional object of the present invention to provide an inertial responsive seat back latch mechanism which is more reliable in operation than prior art devices and which, at the same time, is more economical to manufacture.

SUMMARY OF THE INVENTION

The seat back latch and hinge mechanism embodying the present invention is particularly adapted for use with a vehicle seat assembly having a substantially horizontal seat structure or cushion and an upstanding backrest structure that is pivotally supported for forwardly tiltable movement over the seat structure. The latch mechanism comprises a latch lug projecting from the support arm and a latch pawl pivotally supported on the backrest having a camming abutment and a latching abutment. The camming abutment in normal upright position of the backrest has abutting engagement with the latch lug to hold the latch pawl and its latching abutment in latch lug engaging attitude. Latch lug engaging attitude is a condition in which the latching abutment is not necessarily in contact with the latch lug but is in position to engage the latter upon a predetermined degree of forward tilting movement of the seat backrest. The center of gravity of the latch pawl is located relative to its pivot axis so as to urge the latch pawl from latch lug engaging attitude upon initial movement of the backrest forwardly from its normal upright position. Upon the application of an accelerating tilting force to the backrest which exceeds a predetermined magnitude, the inertia of the latch pawl inhibits movement of the latch pawl in the unlatching direction thereby causing the latching abutment to engage the latch lug and to prevent forwardly tilting movement of the backrest beyond a predetermined minimum degree of movement.

A pendulum means is pivotally connected to the backrest or an element attached to the backrest for free-swinging movement. The latch pawl includes an abutment means cooperatively associated with the pendulum means. The pendulum means has a neutral position or range relative to the abutment means in which position the latch pawl is shiftable about the latch pawl pivot without interference from the abutment means. The pendulum means is displaceable from its neutral position or range upon the application to the backrest of an acceleration force greater than the acceleration force which would permit the latch pawl of its own weight to rotate out of latch lug engaging attitude. The pendulum means, when it is so displaced, coacts with the abutment means to block movement of the latch pawl about its pivot out of latch lug engaging attitude. The latch pawl remains blocked until the magnitude of the pendulum oscillation decreases to its neutral range or position, in which the latch pawl is free to move out of latch lug engaging attitude.

The backrest is pivotally attached to the seat structure by means of a pair of guides and followers so that during initial forwardly tilting movement of the backrest its instantaneous pivot axis or axes are spaced forwardly of the backrest a greater distance than during later forward tilting movement. Furthermore, upon initial forwardly tilting movement the backrest must be displaced upwardly as well as pivotally. The purpose of this structure is to prevent a backrest having an occupied child seat attached to it from tilting forwardly during normal braking of the vehicle by positioning the initial instantaneous pivot axis of the backrest ahead of the center of gravity of the backrest and its attached mass. Thus, the weight of the attached mass acts in opposition to the deceleration forces acting on the backrest. During the more rapid normal braking with a child seat attached, the guide and follower hinge structure retards forward tilting movement of the backrest to an extent that the pendulum means is sufficiently displaced to block the latch pawl and prevent its movement out of latch lug engaging attitude.

BRIEF DESCRIPTION OF THE DRAWINGS

FIG. 3 is a cross-sectional view taken along line 3—3 of FIG. 2.

FIG. 4 is a cross-sectional view taken along line 4—4 of FIG. 2.

DETAILED DESCRIPTION OF A PREFERRED EMBODIMENT

Figure 1:
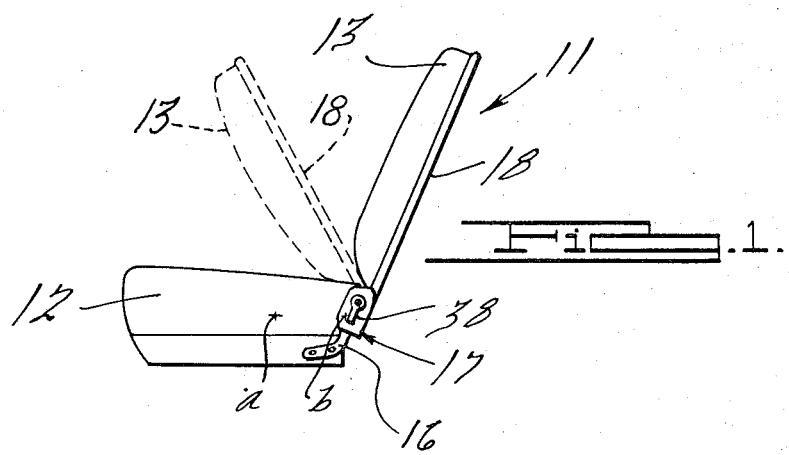
FIG. 1 shows a seat back assembly and an inertia responsive latch mechanism embodying the subject invention. The normal upright position of the backrest is shown by the solid lines. A forwardly tilted position of the backrest is shown by the broken lines.

FIG. 1 illustrates a vehicle seat assembly, generally designated 11, as viewed from the left-hand side of a vehicle. The seat assembly comprises a substantially horizontal seat or cushion structure 12 and a normally upstanding backrest structure 13 which is pivotally supported in part by a pair of pivot shafts or pins 14 rigidly connected to the backrest. A pair of support arms 16 is fixedly mounted to the sides of the seat cushion structure 12. The backrest 13 is forwardly tiltable to a position as shown in the broken lines of FIG. 1 to permit entrance to and exit from the rear passenger assembly of the vehicle.

Figure 2:
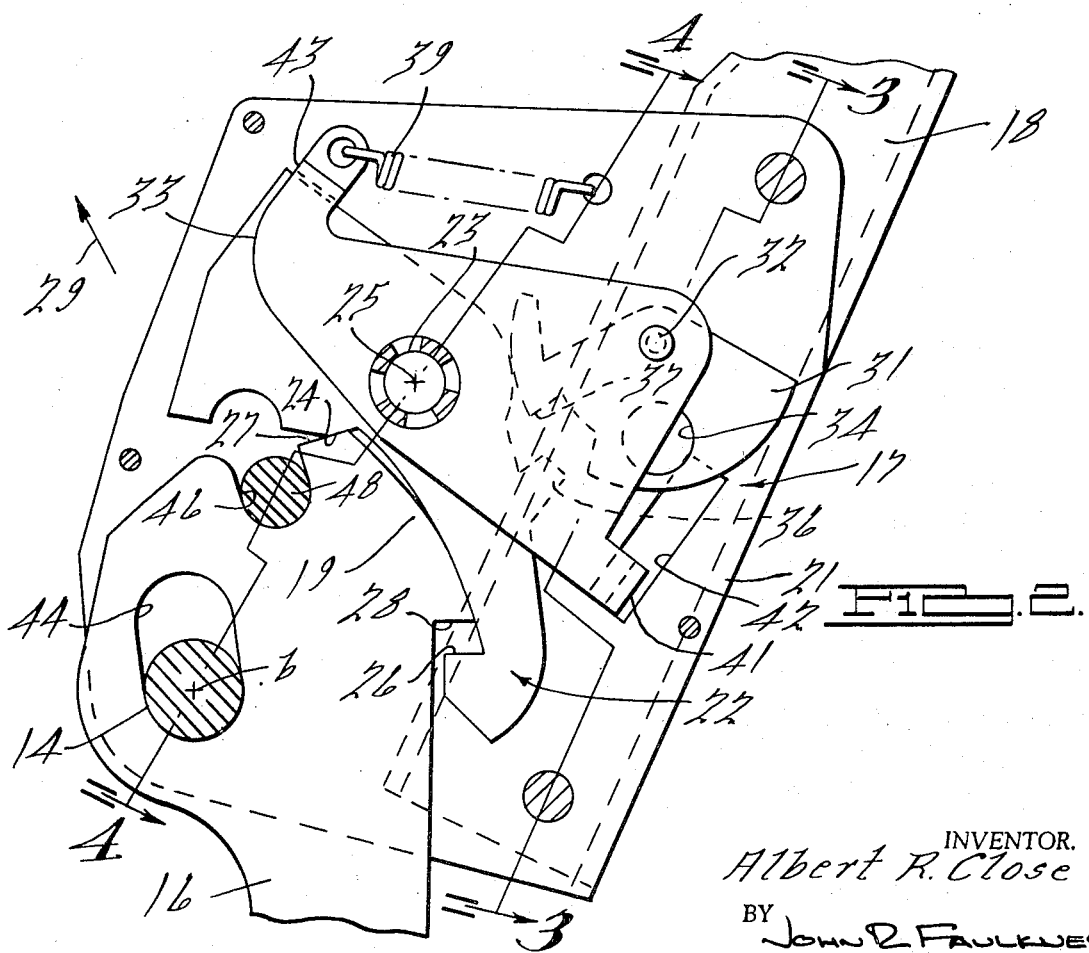
FIG. 2 is a side elevational view of the inertia responsive latch mechanism with certain elements shown in cross section.

The present invention is concerned with controlling the forward tilting movement of the backrest 13 about the shafts 14, i.e., in a counterclockwise direction as viewed in FIGS. 1 and 2. This control is accomplished in part through a latch mechanism, generally designated 17, all the components of which except one are mounted on the backrest frame structure 18. The single component of the latch mechanism not mounted on the backrest is a latch lug 19 carried on the upper end of the support arm 16.

The components of the latch mechanism mounted on the backrest are enclosed within a cover 20 and supported on a backing plate 21 which is secured to the backrest frame 18. A latch pawl, generally designated 22, is pivotally carried on a pivot shaft 23 to rotate about axis 25 and is the major functional element of the latch mechanism 17. The pivot axis 25 defined by the shaft 23 parallels the axis of the shaft 14 about which the backrest 18 pivots or tilts during most of its forward movement.

FIG. 2 shows the latch elements in relative relationship when the backrest 18 is in its normal upright position shown by the solid lines in FIG. 1. The latch pawl 22 has a camming abutment 24 and a latching abutment 26. The camming abutment abuts the front face 27 of the latch lug 19, while the latching abutment, which is in a form of a hooklike appendage, is in spaced, but aligned relation to the rear face 28 of the latch lug 19. For the purpose of definition, the latching abutment 26 is considered to be in latch lug engaging attitude when in the FIG. 2 position.

The center of gravity or mass of the latch pawl 22 is located forwardly of the latch pawl pivot axis 25. This provides a moment to the latch pawl which tends to rotate the latch pawl counterclockwise, as shown in FIG 2, and out of latch-engaging attitude. It is desirable that the center of mass fall on or near a horizontal line passing through the pivot center of the latch pawl so that the latch pawl is substantially unaffected by linear accelerations and decelerations of the vehicle.

The initial forward tilting movement of the backrest 11 from its normal upright position, as shown in FIG. 1, causes the shaft 14 to move in the direction of the arrow 29, shown in FIG. 2. If the rate at which the acceleration force is applied is relatively low, as when a rear seat occupant pushes against the backrest for entrance to or exit from the rear passenger seat compartment, the location of the center of gravity of the latch pawl 22 causes it to rotate counterclockwise in an attempt to maintain abutment contact between surface 24 of the latch pawl and surface 27 of the support member 16. The counterclockwise movement of the latch pawl displaces the latch pawl from its latch lug engaging attitude as shown in FIG. 2 into an attitude in which the latching abutment 26 and face 28 of the latch lug 19 do not engage.

In the event that an exceptionally large acceleration force were applied in a forwardly direction to the backrest 13, the inertia of the latch pawl 22 would oppose the counterclockwise moment caused by the location of the center of mass of the pawl, thereby preventing significant counterclockwise rotation of the latch pawl relative to the backrest and maintaining a latch lug engaging condition that would prevent the backrest from being thrown forwardly.

It has been found that there are times in which it is desirable that the backrest 13 be latched against the forward tilting movement upon deceleration of the vehicle at a rate less than that resulting from a collision or a panic stop. It has also been found that the vehicle backrest upon rebounding from an attempt to pivot forwardly would become unlatched so that upon a secondary impact, such as occurs when the vehicle occupant is being bounced around in the rear passenger compartment, the seat will become unlatched and tilt forwardly, thereby losing its effectiveness as a barrier and perhaps causing further injury to the person occupying the seat cushion forwardly of the backrest. Accordingly, it is a feature of the present invention to provide a means for holding the latch pawl 22 in the latched position for a predetermined period of time following the initial acceleration application to the backrest. This means comprises a pair of pendulum or inertia plates 31, which are normally suspended from a predetermined point 32 relative to the backrest by latch plate 33. One of the pendulums is formed with a hole 34 which imparts to it a frequency different from the other pendulum. Upon tilting the backrest forwardly as would be intentionally done by a passenger, the pendulums are displaced relatively little and the abutment means 36 protruding from the latch pawl 22 is received within recesses 37 formed in each of the pendulum plates. The receipt of the abutment 36 into the recesses 37 permits rotation of the patch pawl 22 from its latch lug engaging attitude. Upon the application of a force to the backrest in a forwardly direction of a magnitude less than that in which the inertia of the latch pawl would cause the latch lug to remain in its latch lug engaging attitude, but following rapidly after a larger force, the magnitude of swing of the pendulum plates 31 will be greater than the circumferential lengths of the annular recesses 37 and the latch pawl abutment means 36 will engage the rounded bottom periphery of the pendulum plates and be prevented from unlatching. Because of the hole 34 in one of the pendulums, the periods of the pendulums are different and the possibility that both recesses are simultaneously angularly aligned with the abutment 36 is extremely remote and undesired unlatching is thereby prevented.

The latch plate 33, in addition to suspending the pendulum means 31 in cooperative position with the latch pawl, serves as a manual release mechanism for the latch pawl 22. A handle 38 is secured to the latch plate so that pivotal movement of the handle about the axis 25 of shaft 23 causes a corresponding movement of the latch plate. A spring 39 interconnects the upper portion of the latch plate and the backing plate 21 which, in turn, is secured to the backrest support structure 18. An abutment tab 41 extends from the latch plate into a slot 42 formed in the backing plate to provide with spring 39 a positive stop, biased normal location of the latch plate. A second abutment 43 is engageable with the latch pawl upon counterclockwise rotation of the latch plate, according to FIG. 2, to rotate the latch pawl out of latch lug engaging attitude, thereby permitting forward tilting of the seat backrest.

Suspension of the pendulum means 31 from the latch seats 33 provides reliable cooperation with the latch pawl. It should be noted that the construction described herein is particularly adaptable to variances and economies of high volume production.

An additional feature of the invention is a nontilt provision for preventing the weight of an occupied child's seat attached to the seat backrest 13 from causing the backrest to tilt forwardly. This is prevented by so constructing the hinge elements that the pivot center or centers of the seat backrest during initial forward movement are more forwardly located than the center of mass of the attached child's seat and occupant. The support arm 16, attached to the horizontal seat structure 12, has a pair of guides or slots 44 and 46 formed therein which slidingly receive pin members or followers 14 and 48, respectively. The pin members are attached to the backing plate 21 which moves with the backrest 13. The slots are relatively obliquely disposed so that the instantaneous axes of rotation of the backrest during initial forward tilting movement are spaced forwardly of normal pivot pin 14 approximately 8 or 9 inches. The instantaneous axis of rotation upon initial forward movement of the backrest is designated "$a$" in FIG. 1; the later or normal pivot axis is designated "$b$." Thus, the weight of the child acts to maintain the seat backrest in its normal upright position. It may be seen then that upon initial forward movement from the normal upright position of the backrest the entire backrest assembly will move upwardly as well as forwardly relative to the fixed support arm. Slot 46 is open ended and permits the pin member 48 to exit after a predetermined moment of forward tilting movement at which time conventional pivoting about the axis "$b$" of pin 14 begins.

Other modifications and alterations will occur to those skilled in the art which are included within the scope of the following claims.

I claim:

1. A seat back position control mechanism for a vehicle seat assembly having a substantially horizontal seat structure and a normally upright backrest, the backrest being forwardly tiltable over the seat structure on support arms pivotally connected to the seat structure, the control mechanism comprising:

a latch lug projecting from a support arm, a latch pawl pivotally supported on the backrest and having a camming abutment and a latching abutment, the camming abutment in normal upright position of the backrest having abutting engagement with the latch lug to hold the latch pawl and the latching abutment thereon in latch lug engaging attitude, means urging the latch pawl about its pivot in a direction tending to displace the latching abutment from latch lug engaging attitude upon initial movement of the backrest forwardly from its normal upright position, the inertia of the latch pawl upon an accelerating tilting force being applied to the backrest inhibiting movement of the latch pawl in the aforementioned direction to cause the latching abutment to engage the latch lug and prevent forward tilting of the backrest beyond a predetermined minimum degree of movement, pendulum means pivotally connected to the backrest for free-swinging movement, an abutment means positioned to coact with the pendulum means, the pendulum means having a neutral position relative to the abutment means in which position the latch pawl is shiftable about the latch pawl pivot without an interference from the abutment means, the pendulum means being displaceable from its neutral position upon the application to the backrest of an accelerated force less than the accelerated force which would cause the latch pawl of its own inertia to remain in latch lug engagement attitude, the pendulum means when so displaced coacting with the abutment means to block movement of the latch pawl about its pivot out of latch lug engagement attitude.

2. A control mechanism according to claim 1 and including:
a pair of slots formed in at least one support arm,
a pair of pins connected to the backrest and slidably received within said slots,
the instantaneous axes of rotation of the backrest relative to the support arm being determined by the relative positions of the pair of slots.

3. A control mechanism according to claim 1, in which:
the abutment means protrudes from the latch pawl for engagement with the pendulum means.

4. A control mechanism according to claim 1 and including:
the pendulum means comprising a plurality of independent swingable weights having different natural frequencies of swinging movement to provide a time delay effect before all weights return to a neutral position after having been displaced therefrom.

5. A control mechanism according to claim 3 and including:
the pendulum means comprising a plurality of independent swingable weights having different natural frequencies of swinging movement to provide a time delay effect before all weights return to a neutral position after having been displaced therefrom.

6. A control mechanism according to claim 1 and including:
a latch plate supported on the backrest to pivot about the same point as the latch pawl,
the latch pawl being freely pivotal out of latch lug engaging attitude without interference from the latch plate,
the latch plate being pivotal relative to the backrest to cause the latch pawl to rotate out of latch lug engaging attitude,
control means attached to the latch plate to cause movement thereof.

7. A control latch mechanism according to claim 6 and including:
the pendulum means mounted on the latch plate for free-swinging movement.

8. A control mechanism according to claim 7 and including:
biasing means urging the latch plate into a normal position,
the pendulum means being formed with a peripheral recess positioned adjacent the abutment means when the latch pawl is in a latch lug engaging attitude, the latch plate is in its normal position and the pendulum means is freely depending without swinging,
the abutment means being receivable within said recess to permit displacement of the latch pawl from latch lug engaging attitude, the abutment means being engageable with the pendulum means when swinging to prevent displacement of the latch pawl from latch lug engaging attitude.

9. A seat back position control mechanism for a vehicle seat assembly having a substantially horizontal seat structure and a normally upright backrest supported thereon for forwardly tiltable movement over the seat structure,
the mechanism comprising a first member and a second member,
the first member movably connected to the second member for pivotal movement thereabout,
first guide means formed on one of the first and second members,
a first follower means attached to the other of the members movingly engageable with the first guide means,
second guide means formed on one of the members,
a second follower means attached to the other of the members movingly engageable with the second guide means,
the instantaneous centers of relative rotation of the first and second members being determined by the relative positions of the first and second guide means.

10. A control mechanism according to claim 9 and including:
the guide means being so disposed that the instantaneous axes of rotation of the first member relative to the second member are more distantly spaced from said first and second guide means during initial backrest forwardly tilting movement than during later backrest forwardly tilting movement.

11. A seat back position control mechanism for a vehicle seat assembly having a substantially horizontal seat structure and a normally upright backrest pivotally supported on support arms for forwardly tiltable movement over the seat structure,
the mechanism comprising a first member and a second member pivotally connecting the seat structure and the backrest,
the first member having a pair of slots formed therein,
pin means secured to the second member being slidably received within the slots,
the slots being relatively disposed so that the backrest upon initial forward movement away from its normal upright position has instantaneous pivot axes spaced more distant from the pin means in the direction of the forward tilt of the backrest than during later forward movement of the backrest.

12. A control mechanism according to claim 11 and including:
one of the slots having an open end,
one of the pin means traversing the extent of and exiting the open end slot during a first portion of forwardly tilting movement of the backrest,
the instantaneous pivot centers of the backrest being located within the periphery of the other of the slots following exit of the one pin means from the open end slot.

13. A control mechanism according to claim 11 wherein:
the slots are relatively obliquely disposed thus imparting a rotational movement to the second member as the pin means transverse the slots.

14. A control mechanism according to claim 1 in which:
coating pairs of pin and slot means form the pivotal connection of the support arms to the seat structure,
the pin and slot means defining an instantaneous center of rotation about which the backrest is movable from its normal upright position at first with a slight rising motion and then a forwardly tilting motion,
the normal center of gravity of the backrest lying a predetermined distance from the instantaneous center of rotation and thereby requiring for forward movement of the backrest the application of a forwardly directed force sufficient to overcome the normal center of gravity force couple resisting movement of the backrest about the center of rotation, the construction and arrangement of the pin and slot means being such that a child seat attached to the backrest and occupied by a child substantially shifts the center of gravity of the backrest away from the instantaneous center of rotation thereby increasing the amount of force that must be applied before forward movement of the backrest from its normally upright position will occur.

15. A control mechanism according to claim 1 and including:

coating pair of pin and slot means forming the pivotal connection of the support arms to the seat structure, the pin and slot means defining an instantaneous axis of rotation about which the backrest is initially movable from its normal upright position with generally upwardly directed linear displacement and forwardly directed angular displacement.

* * * * *